Patented Mar. 31, 1931

1,798,993

UNITED STATES PATENT OFFICE

ARTHUR T. W. WARNKEN, OF WABUSKA, NEVADA, ASSIGNOR OF ONE-HALF TO EMANUEL JOHNSON, OF SAN FRANCISCO, CALIFORNIA

PROCESS OF OBTAINING SODIUM SULPHATE FROM NATURAL DEPOSITS

No Drawing.     Application filed October 4, 1929.  Serial No. 397,458.

This invention appertains to an improved process for obtaining pure sodium sulphate ($Na_2SO_4$) without foreign ingredients from natural deposits containing other substances such as sodium chlorid, sodium biborate and potassium.

The primary object of my invention is to provide a simple, cheap and economical process for forming pure anhydrous sodium sulphate from natural deposits by the use of natural or artificial heat and fresh water, the soduim sulphate thus formed according to my process being in the nature of hard rock without any impurities therein.

In certain Western States there are natural deposits of sodium sulphate mixed with other substances such as sodium biborate, potassium or potash, sodium chlorid and sodium carbonate. My process has been applied more particularly to the natural deposits found in the State of Nevada, and which contain sodium sulphate, sodium chlorid and potassium (potash), and my process is particularly adapted for such deposits, but is not limited to this particular deposit as the same can be applied to equal advantage in other deposits containing other ingredients.

In the preferred form of my process, a vat is constructed directly in the deposit or field and this forms one of the essential features of my invention. Shallow ditches are now dug from different points of the deposit and led and inclined toward the vat. This is also an important step in my process, as will be later more particularly pointed out.

The vat is now covered with fresh water to a depth which varies according to the season of the year. For hot summer weather, the vat is preferably covered to a depth of six inches with the fresh water and this depth is increased in the fall, spring or cool weather to a depth of two feet. The sulphate bed or deposit is also covered with water to a depth which varies from one-half inch to three inches according to the season and locality.

The fresh water is heated by the sun during the daytime and the sodium sulphate crystals in the natural deposits begin to melt at 90° Fahrenheit and form a hot strong saturated liquor. This heavy saturated liquor tends to gravitate down the ditches into the vat and the heavier liquor containing the sulphate gradually collects in the vat.

During the night time the liquor cools which causes the sodium sulphate to drop into the bottom of the vat, where the same gradually collects in a substantially natural state and deposit.

Fresh water is continuously supplied to the sulphate bed during the entire time of the recovering of the sodium sulphate and is preferably kept at the depth mentioned above.

The continuous warming and cooling of the water alternately collects the sodium sulphate from the natural bed or deposit and drops the same into the bed of the vat where the same forms a hard rock forming a pure anhydrous sodium sulphate.

After this rock has formed to the desired depth, the time of which varies according to the nature of the deposit and the season of the year, this rock is removed from the vat in slabs by the use of pick axes or the like.

This rock can now be shipped to the desired points and otherwise treated to reduce the same to a commercial state.

While I prefer to use the natural heat of the sun for forming the sodium sulphate, it is obvious that artificial heat can be employed in lieu thereof, which artificial heat can be in the nature of steam pipes extending through the water placed over the natural bed.

I have found that in my deposit the sodium sulphate will form first in the vat and after the sodium sulphate has been removed in its anhydrous rock state, I can recover the sodium chlorid and potassium (potash) therein. The sodium chlorid will crystallize second to the sodium sulphate, while the potassium is the last thing to crystallize. By raising the temperature in the vat during the daytime and decreasing the temperature of the vat at night, the salt or sodium chlorid will be caused to precipitate and collect at the bottom of the vat, where the same can be removed in the same manner as the sodium sulphate. After the sodium chlorid has been recovered, the potash or potassium can be recovered from the liquor in the same way or by evaporation of the water.

It is to be understood, however, that I do not rely upon evaporation of the water to form my anhydrous sodium sulphate and in fact evaporation is fatal to my process and the sodium sulphate must be formed by precipitation.

In processes within my knowledge that use evaporation for the recovery of borax (sodium biborate), sodium sulphate and the like, the substances are recovered in a mixed impure condition, which requires a further process to refine the same.

In certain regions, the natural deposits of sodium sulphate are covered or partially covered with a mud or marl and in such deposits this mud or marl is removed by suitable scrapers or the like before my process is brought into play.

It is to be noted that in my process the water or liquor is not agitated in any way and the sodium sulphate is allowed to precipitate naturally which insures the recovering of the same in a pure state.

The hydrous sodium sulphate crystals melt in the water during the day (when it is hot) and when the water cools in the evening and night, the sodium sulphate drops out of the hot liquor and gravitates down the ditches to the vat. The natural heat filling the vat within which the sodium sulphate is contained allows the natural coolness of the night to act thereon, and this produces a weak solution which is ready for quick action on the following day. In this way the vat is continuously replenished, so as to make the anhydrous sodium sulphate the desired thickness wanted. After once getting the deposits started in this manner additional fresh water will only have to be added two or three times during the season. Deposits, where brine is found, can also be worked in this manner, but pumps can be used to pump out the brine to make the natural sodium sulphate deposits for working according to my process. By using my process the anhydrous sodium sulphate will turn into hard rock and thus the sodium sulphate will not dry up and be blown away by the wind.

Fresh water does not have to be added very often as hydrous sodium sulphate contains about forty per cent water and the melting of the crystals replenishes the vat with water. Where I have used the term fresh water in the specification and claims it is to be construed to mean extraneous water poured on the deposits and vat as sodium sulphate brine instead of fresh pure water can be used.

A cool night causes the sodium to drop and the vat catches and retains the same. While the water is warm, the heat is sometimes held by the vat due to the deep water contained therein and the heat retained keeps the sodium from turning back to hydrous crystals. The solution is so strong that it will not dissolve the anhydrous sodium sulphate formed in the vat. The water being very thin over the deposits moves off very quickly and drops the sodium at night.

Changes in details of my process may be made, but:—

What I claim as new is:

1. The process of recovering sodium sulphate from natural beds which comprises covering the natural bed with fresh water, subjecting the fresh water to natural temperature conditions of day and night whereby the water is heated during the day to collect the sodium sulphate deposit and cooled during the night to precipitate the deposit, and leading the warmed water during the day period to a collection vat.

2. The process of recovering and forming pure anhydrous hard rock sodium sulphate from natural beds containing other substances which comprises the forming of a vat in the natural bed, digging sloping ditches in the bed leading toward the vat, filling the vat to a predetermined depth with fresh water, covering the natural deposit to a less depth with fresh water, subjecting the fresh water to the natural temperature conditions of day and night whereby the liquor is heated during the day period to absorb the sulphate deposit and to gravitate to the vat and precipitate the sodium sulphate in the vat during the night period.

3. The process of recovering sodium sulphate from natural deposits which comprises the forming of a vat in the natural deposit, forming ditches in the natural deposit leading toward the vat, filling the vat with fresh water to the desired depth, covering the natural deposit to a less depth with fresh water, alternately subjecting the water to heat and cold in different periodic cycles, whereby the heated water will be saturated with the sodium sulphate and gravitate toward the vat and precipitate the sodium sulphate in the vat when filled, and continuously supplying fresh water to the natural deposit to maintain the water at the predetermined depth.

4. The process of recovering anhydrous sodium sulphate, sodium chlorid and potassium by precipitation from natural deposits which comprises the forming of a vat in the natural deposit, providing ditches inclining toward the vat in the natural deposit, continuously supplying fresh water to the bed and vat at a predetermined depth, subjecting the water to heat and cold in different periodic cycles, until the sodium sulphate has been precipitated, removing the sodium sulphate from the vat, continuing the process until the sodium chlorid has been precipitated, removing the precipitated sodium chlorid from the vat, and continuing the process until the potassium has been precipitated.

In testimony whereof I affix my signature.

ARTHUR T. W. WARNKEN.